United States Patent [19]

Pedain et al.

[11] 4,401,801

[45] Aug. 30, 1983

[54] COATING AND DRESSING AGENTS FOR LEATHER AND LEATHER SUBSTITUTES BASED ON POLYURETHANE UREA COATING COMPOUNDS

[75] Inventors: Josef Pedain, Cologne; Wilhelm Thoma, Leverkusen; Jürgen Grammel, Cologne; Walter Schröer, Leverkusen, all of Fed. Rep. of Germany

[73] Assignee: Bayer Aktiengesellschaft, Leverkusen, Fed. Rep. of Germany

[21] Appl. No.: 408,371

[22] Filed: Aug. 16, 1982

[30] Foreign Application Priority Data

Aug. 28, 1981 [DE] Fed. Rep. of Germany ....... 3134112

[51] Int. Cl.$^3$ ............................................. C08G 18/65
[52] U.S. Cl. ........................................ 528/67; 528/76; 528/83
[58] Field of Search ............................. 528/67, 76, 83

[56] References Cited

U.S. PATENT DOCUMENTS 3,857,809 12/1974 Oertel et al. ................ 260/33.8 UB
4,371,684 2/1983 Quiring et al. ........................ 528/83

FOREIGN PATENT DOCUMENTS 2623961 12/1977 Fed. Rep. of Germany .
1550322 8/1979 United Kingdom .

Primary Examiner—Maurice J. Welsh
Attorney, Agent, or Firm—Gene Harsh; Lawrence S. Pope; Thomas W. Roy

[57] ABSTRACT

This invention relates to coating agents and dressing agents for leather and leather substitutes with improved resistance to plasticizer migration, greater hardness and folding strength, a dry hand and resistance to aqueous alcoholic solutions, based on linear or only slightly branched thermoplastic polyurethane ureas built up from the following components
(A) at least two macrodiols in a molar ratio of from about 1:6 to 6:1, one of which macrodiols
  (1) has an average molecular weight of from about 254 to 650 and contains at least one benzene, cyclohexane or cyclohexene ring, while
  (2) the second macrodiol has an average molecular weight in the range of from about 1200 to 3000 but has at least three times the molecular weight of A/1, and which contain
(B) from about 0.5 to 11 mol of chain lengthening agent per mol of macrodiol mixture, at least about 50 mol % of the chain lengthening agents used being aliphatic and/or cycloaliphatic diamines and/or hydrazine,
and in which
(C) the diisocyanates used are cycloaliphatic diisocyanates, up to about 50 mol % of which may be replaced by aliphatic and/or aromatic diisocyanates.

14 Claims, No Drawings

COATING AND DRESSING AGENTS FOR LEATHER AND LEATHER SUBSTITUTES BASED ON POLYURETHANE UREA COATING COMPOUNDS

BACKGROUND OF THE INVENTION

1. Field of the Invention

This invention relates to coating agents for leather and leather substitutes, which coating agents contain a polyurethane starting material. They may be used for coating and dressing leather and leather substitute materials from solution. By virtue of the special composition of the polyurethane, the dressings and coatings obtained have very desirable qualities which in their totality are novel and unexpected.

2. Description of the Prior Art

The coating applied to leather or synthetic leather, also known as final lacquer, dressing or finish, is intended to impart to the substrate a particular appearance (color shade or gloss) or a particular "hand" and to provide resistance to external influences.

The coating must therefore adhere firmly to the substrate, have great hardness and flexibility under bending and be resistant to wet and dry abrasion. When applied to synthetic leathers (e.g., PVC leather substitute) which contain plasticizers and/or dyes, the dressing must completely prevent migration of the plasticizers or dyes such as organic pigments to the surface since such migration would make the coated articles tacky on the surface and unsightly. If an article is composed of differently colored parts, the dressing must prevent the organic dyes from "bleeding". By this is meant the migration of organic dyes from colored to uncolored or differently colored portions of material by means of plasticizers or fats.

Another problem that has hitherto only been solved unsatisfactorily with the known polyurethane dressings is the question of solvents. Particularly when using polyurethanes based on aromatic diisocyanates it has been necessary to use solvents which are not ideal for dressings. Dimethylformamide, for example, which is frequently used, has the disadvantage that it partly dissolves the substrate or causes it to swell considerably and owing to its high boiling point it only slowly evaporates from the film of dressing at room temperature. Solutions which contain dimethylformamide may, therefore, severely attack the substrate or even destroy it.

Another commonly used polyurethane solvent is tetrahydrofuran but this also has disadvantages for use in the leather industry. Thus it has an unpleasant smell and very readily forms peroxides so that it is difficult to recover by distillation.

The coating agents known in the art also include copolyamides which are soluble in mixtures of hydrocarbons and alcohols. These products may also be used to produce dressings which have a pleasant hand and high resistance to diffusion but they have the serious disadvantage of being highly sensitive to alcohols, e.g. aqueous ethanol.

It is an object of the present invention to provide a one-component polyurethane system suitable for dressing or coating leather or leather substitutes, which does not have the disadvantages mentioned above and has improved qualities compared to the known polyurethane dressing agents. The dressing agent should in particular constitute an improved barrier to plasticizers and have great hardness and folding strength, impart a dry, pleasant hand to the substrate and be soluble in solvents such as aromatic hydrocarbons, ketones and alcohols and form solutions which are stable in storage.

This problem has been solved by using polyurethane ureas prepared from different macrodiols (as soft segments) which have a special structure.

It is known that the use of different macrodiols in polyurethanes improves the mechanical characteristics, in particular the tensile strength. Thus, for example, a process for the preparation of polyurethanes using different macrodiols has been described in German Auslegeschrift No. 2,623,961. This process, however, requires the use of separately prepared isocyanate prepolymers which are then mixed before the polyurethane is formed. This three-stage process, therefore, has the disadvantage of being complicated and laborious. Moreover, the products obtained are not ideally suitable for the dressing of leather and leather substitutes.

SUMMARY OF THE INVENTION

The present invention relates to coating agents and dressing agents for leather and leather substitutes based on linear or slightly branched, thermoplastic polyurethane ureas which are synthesized from diisocyanates, macrodiols, chain lengthening agents such as diamines and optionally triamines, diols and/or triols and optionally chain breaking agents such as monohydric alcohols and monoamines, characterized in that the polyurethane ureas used are built up of the following components:

(A) 2 macrodiol components in a molar ratio of from about 1:6 to 6:1, preferably from about 1:3 to 3:1,
  1. one of which has a molecular weight of from about 254 to 650, preferably about 350 to 600, and contains at least one benzene group, a cyclohexane group or a cyclohexene group,
  2. while the second macrodiol component has an average molecular weight which is at least about three times that of the first macrodiol and is in the range of from about 1200 to 3000,
(B) the said polyurethane ureas containing from about 0.5 to 11 mol, preferably from about 0.8 to 7.5 mol of chain lengthening agents per mol of macrodiol mixture, at least 50 ml % of the said chain lengthening agents being aliphatic and/or cycloaliphatic diamines and/or hydrazine, and
(C) the diisocyanates used being cycloaliphatic diisocyanates, up to about 50 mol % of which, preferably up to about 25 mol %, being replaced by aliphatic and/or aromatic diisocyanates.

DETAILED DESCRIPTION OF THE INVENTION

The dressing agents and/or coating agents according to the invention for leather and leather substitutes are high molecular weight but virtually uncrosslinked thermoplastic polyurethane ureas prepared in solution or solvent free. They are characterized inter alia in that they may be applied without the aid of dimethylformamide, tetrahydrofuran or other corrosive, high polar solvents and may be dissolved and used in readily evaporating mixtures of solvents such as aromatic hydrocarbons and aliphatic alcohols or pure solvents based on ketones such as acetone, methyl ethyl ketone or methylisobutyl ketone or aromatic hydrocarbons such as toluene or xylene or in alcohols such as methanol, ethanol, n-propanol and isopropanol or esters such as butyl acetate and ethyl acetate.

What is surprising and not to be expected from the state of the art is that in spite of being readily soluble in so-called soft solvents, the coating agents according to the invention have excellent abrasion resistance, are highly resistant to plasticizers and act as excellent plasticizer barriers, and are distinguished by their firm adherence to their substrate and their resistance to dry and wet abrasion. They are also surprisingly resistant to aqueous alcohol.

A large number of components which are known as such are suitable starting materials for the polyurethanes which form the basis of the coating and dressing agents according to the invention.

According to the invention, at least two relatively high molecular weight polyhydroxyl compounds (A/1) and (A/2) with differing molecular weights and a particular structure are used as macrodiols for the preparation of polyurethanes. Any macrodiols, i.e. polyhydroxyl compounds with an average hydroxyl functionality of approximately 1.8 to 2.2, preferably about 1.95 to 2.05, are suitable in principle but polyesters, polyethers and polycarbonates are mainly used for the purpose. The polyhydroxyl compounds (A/1) and (A/2) with different molecular weights are used in a molar ratio of from about 1:6 to 6:1, preferably from about 1:3 to 3:1, for the preparation of the polyurethane ureas.

The macrodiols (A/2) which have an average molecular weight of from about 1200 to 3000 may be any polyethers, polyesters and polycarbonates which have the average hydroxyl functionality mentioned above. Suitable hydroxyl polyethers for the purpose of the invention are known per se and may be prepared, for example, by the polymerization of cyclic ethers such as ethylene oxide, propylene oxide, butylene oxide, tetrahydrofuran, styrene oxide or epichlorohydrin, either on their own, e.g. in the presence of $BF_3$, or by the addition of these ring compounds, optionally as mixtures or successively, to starting components containing reactive hydrogen atoms, such as alcohols, amines or water, e.g. ethylene glycol, propylene glycol-(1,2) or -(1,3) or 4,4'-dihydroxydiphenylpropane.

The hydroxyl polycarbonates used may be of known type, e.g. those prepared by the reaction of diols such as propanediol-(1,3), butanediol-(1,4) and/or hexanediol-(1,6) or di-, tri- and/or tetraethylene glycol with diarylcarbonates, e.g. diphenylcarbonate, or phosgene. It is preferred to use polycarbonates based on hexanediol-(1,6) as well as minor quantities of codiols which may or may not have a modifying action (about 5 to 35 mol % of these diols), e.g. butanediol-(1,4) or diethyleneglycol. Polycarbonates based on $HO(CH_2)_6.O.CO.(CH_2)_5.OH$ are also suitable.

The hydroxyl polyesters used may be, for example, reaction products of polyhydric, preferably dihydric alcohols with the optional addition of trihydric alcohols and polybasic, preferably dibasic carboxylic acids. Instead of free polycarboxylic acids, the corresponding polycarboxylic acid anhydrides or corresponding polycarboxylic acid esters of lower alcohols or mixtures thereof may be used for preparing the polyester.

The polycarboxylic acids may be aliphatic, cycloaliphatic, aromatic and/or heterocyclic compounds and are optionally substituted, e.g. by halogen atoms, and/or unsaturated. The following are examples:

Succinic acid, adipic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, di- and trimeric fatty acids, dimethylterephthalate, and terephthalic acid-bis-glycol esters.

The following are examples of suitable polyhydric alcohols: ethylene glycol, propylene glycol-(1,2) and -(1,3), butylene glycol-(1,4) and -(2,3), hexane-diol-(1,6), octanediol-(1,8), neopentylglycol, 1,4-bishydroxymethylcyclohexane, 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methyl glycoside, di-, tri- and/or tetra-ethyleneglycol or -propyleneglycol or polyethylene glycol or polypropylene glycol, di-, tri- and tetrabutylene glycols and polybutylene glycols. The polyesters may contain a proportion of carboxyl end groups. Copolymers based on hexanediol-(1,6) are particularly preferred, e.g. an adipic acid-hexanediol-(1,6)/neopentyl glycol polyester (molar ratio of diols about 55:45 to 80:20; molecular weight about 1600 to 2100).

Polyesters of lactones, e.g. of $\epsilon$-caprolactone, or of hydroxycarboxylic acids, e.g. $\omega$-hydroxycaproic acid, may also be used, preferably those started on diethylene glycol.

The relatively short chained macrodiols (A/1) containing 6-membered rings and having average molecular weights of from about 254 to 650 may be polyethers, polyesters or polycarbonates. According to the invention, they must contain at least one aromatic ring, cycloaliphatic ring, preferably cyclohexane, or unsaturated ring, preferably a cyclohexene ring. They also have a hydroxyl functionality of from about 1.8 to 2.2, preferably from about 1.95 to 2.05 and are thus substantially bifunctional. The polyethers according to the invention in this short chained molecular weight range contain cyclic substances such as bisphenols as starter molecules. The following are mentioned as examples: hydroquinone, resorcinol and 4,4'-dihydroxy-diphenylpropane. Propylene oxide, ethylene oxide, butylene oxide, styrene oxide and/or epichlorohydrin are added to these starter molecules either as mixtures or in sequence to form polyethers containing OH end groups. At least one hydroxyether group should be added per reactive group (e.g. OH) of the starter molecules. The preferred polyethers used are those started on 4,4'-dihydroxydiphenylpropane, especially those within a molecular weight range of about 350 to 600 which are based on propylene oxide.

Suitable polyesters are mainly those based on cyclic carboxylic acids, e.g. on orthophthalic acid or orthophthalic acid anhydride, isophthalic acid, terephthalic acid, tetrahydrophthalic acid or hexahydroterephthalic acid. Polyesters based on these acids are preferred but other acids, already mentioned for the preparation of polyesters (A/2), may also be used for modification. Ethanediol polyesters of phthalic acid with molecular weights from about 350 to 600 are particularly preferred.

The hydroxyl polycarbonates used may be, for example, those containing cyclic diols, e.g. 1,4-hydroquinone-bis-hydroxyethylethers or 4,4'-diphenylpropane-bis-hydroxy-propylethers. Polycarbonates with molecular weights in the range of from about 350 to 600 obtained from $\beta$-1,4-dimethylol cyclohexane are particularly preferred.

So-called chain lengthening agents (B) are also used to prepare the polyurethane dressing agents according to the invention. They may in part be low molecular weight diols and optionally also (up to a maximum of about 10 mol %) triols. The following are examples: ethanediol, butanediol-(1,3), butanediol-(1,4), hexanediol-(1,6), trimethylolpropane and glycerol. Other polyols used as chain lengthening agents for the preparation of polyurethanes, such as those described in German Auslegeschrift No. 2,854,384, for example, may also be used.

Essential to the invention are the diamines, which make up at least about 50 mol % of the chain lengthening agents (B). The diamine compounds may be hydrazine and/or aliphatic diamines, e.g. ethylenediamine, propylenediamine, hexamethylenediamine-(1,6), decamethylenediamine-(1,10) or other aliphatic diamines as described in German Auslegeschrift No. 2,854,384. Suitable cycloaliphatic diamines include 1,4-bisaminomethyl-cyclohexane, 4,4'-diamino-3,3'-dimethyldicyclohexylmethane and other ($C_1$–$C_4$)-di- and -tetraalkyl-dicyclohexylmethanes, e.g. 4,4'-diamino-3,5-diethyl-3',5'-diisopropyl-dicyclohexylmethane, but 1-amino-3,3,5-trimethyl-5-aminomethylcyclohexane, 4,4'-diamino-dicyclohexylmethane and/or hydrazine are preferred. Small quantities (less than about 10 mol % of the chain lengthening agents) of triamines may also be used, e.g. diethylenetriamine or 1,6,11-undecanetriamine. At least about 50 mol %, preferably from about 75 to 100 mol % of the chain lengthening agents (B) must be diamine chain lengthening agents, diamines with a cycloaliphatic structure being particularly preferred. Both the diol chain lengthening agents and the diamine chain lengthening agents may consist of mixtures of diols or diamines.

The quantity of chain lengthening agents or mixtures thereof used per mol of macrodiol mixture (A/1) plus (A/2) amounts to approximately about 0.5 to 11 mol, preferably from about 0.8 to 7.5 mol, most preferably from about 1.2 to 4.5 mol.

The chain lengthening agents are normally used in approximately equivalent quantities, based on (remaining) isocyanate groups after subtraction of the portion of the isocyanate groups which have reacted with the macrodiol mixture, although it is preferred to use less than the equivalent quantity, down to about 80% of the isocyanate groups. The remaining isocyanate groups may then be reacted either with monofunctional chain breaking agents such as butylamine, stearylamine, 4-amino-2,2,6,6-tetramethyl-piperidine or morpholine, or preferably with monofunctional alcohols (present in excess as solvents for the polymers), e.g. isopropanol. This prevents excessive increase in the molecular weight or in the cross-linking and chain branching reactions.

The diisocyanates (C) are predominantly cycloaliphatic diisocyanates, preferably 1-isocyanato-3,3,5-trimethyl-5-isocyanatomethyl-cyclohexane and/or 4,4'-diisocyanato-dicyclohexylmethane. The following are also suitable: cyclobutane-1,3-diisocyanate, cyclohexane-1,3- and -1,4-diisocyanate, 1,4-bis-isocyanatomethyl-cyclohexane, 2,4- and 2,6-hexahydro-tolylene diisocyanate, hexahydro-1,3- and/or 1,4-xylylene diisocyanate, 2,4'- and 2,2'-dicyclohexylmethane diisocyanate and any mixtures of the position and/or stereo isomers of the cycloaliphatic diisocyanates.

A certain proportion of aliphatic diisocyanates with a chain structure and aromatic diisocyanates may also be used; up to about 50 mol %, preferably up to about 25 mol % of the cycloaliphatic diisocyanates may be replaced by chain aliphatic or aromatic diisocyanates. The latter are less preferred, because polyurethanes based on aromatic diisocyanates have a tendency to discolor. Suitable diisocyanates from these two classes include the following: 1,4-tetramethylene diisocyanate, 1,6-hexamethylene diisocyanate, 1,12-dodecanediisocyanate, lysine alkyl ester diisocyanates and, among the aromatic diisocyanates, 2,4- and 2,6-tolylenediisocyanate and any mixtures of these isomers, diphenylmethane-2,4'- and/or 4,4'- and/or 2,2'-diisocyanate and symmetric or asymmetric substituted mono- or bis-tetraalkyl substituted $C_1$–$C_4$-alkyl-diphenylmethane-diisocyanates.

The quantity of polyisoyanates used for the preparation of the polyurethane urea dressing agents according to the invention is at least 2 mol, up to about 12 mol, preferably up to about 8.5 mol, most preferably from 2.2 to 5 mol per mol of macrodiol mixture (A). At least about 90% of the polyisocyanates normally are diisocyanates; up to about 10 mol % of higher than difunctional polyisocyanates (up to triisocyanates) may optionally be used.

The macrodiol mixture and the polyisocyanates are reacted together solvent-free or in solution until all the hydroxyl groups have been used up. Additional solvent is then added and the chain lengthening agent is introduced, optionally as a solution.

An alternative method comprises adding the chain lengthening agent to the solvent-free isocyanate prepolymer obtained from the macrodiol mixture and polyisocyanates in a suitable mixing machine, e.g. an extruder, so that the polyurethane is obtained as a solid substance.

A third method comprises adding a portion of the chain lengthening agent even while the macrodiol mixture is being reacted with the polyisocyanate, but this method may only be employed if the chain lengthening agent is a low molecular weight diol or triol. Further chain lengthening agent is then carried out with a polyamine in solution or solvent-free. Methods of preparation of the dressing agents according to the invention are described in more detail in the Examples which follow.

The solvents used for the preparation and application of the polyurethane urea dressing agents according to the invention may be hydrocarbons, esters, ketones, alcohols and cyclic ethers. The following are examples: toluene, xylene, cyclohexane, ethyl acetate, butyl acetate, methyl and ethyl glycol acetate, acetone, methyl ethyl ketone, methyl isobutyl ketone and tetrahydrofuran. Suitable alcohols include ethanol, n-propanol, isopropanol, n-butanol, isobutanol, tert.-butanol and ethyl glycol. The alcohols also serve to regulate the final viscosity of the polyurethane urea (solutions). Amines such as dimethylamine, di-n-butylamine or 1-diethylamino-3-aminopropane may also be used for this purpose. The solvents used are preferably mixtures of relatively apolar solvents and relatively polar solvents, e.g. mixtures of aromatic hydrocarbons (such as toluene, xylene or higher aromatic hydrocarbons) with alcohols, esters or ethers, preferably with primary, secondary or tertiary alcohols such as ethanol, isopropanol, isobutanol or tert.-butanol. These mixtures may also contain solvents such as aliphatic hydrocarbons, ketones, esters or cyclic ethers.

The known catalysts may be used for the reaction of the polyisocyanates, e.g. tertiary amines, metal salts such as tin dioctoate, lead acetate and potassium acetate, and organometallic compounds such as dibutyl tin(IV)dilaurate. The polyurethanes according to the invention may also be prepared and applied in highly polar solvents such as dimethylformamide or N-methylpyrrolidone, but this is not preferred. The above-mentioned less polar solvents and solvent mixtures of aromatic hydrocarbons and alcohols are advantageously and preferably used. The polyurethane ureas according to the invention are very readily soluble in these solvents.

The polyurethane ureas according to the invention have a melting point above 100° C., preferably from about 130° to 220° C. They have great surface hardness, elongation on tearing and tear resistance.

They may be applied as about 5 to 60% solutions, preferably about 10 to 40% solutions.

The dressing agents prepared from the polyurethane ureas according to the invention may be applied to leather and leather substitutes having a porous or compact surface. Application may be by pressure, spraying, coating with doctor knife or transfer dressing. The polyurethane ureas according to the invention are particularly important for the production of coatings on textile substrates by the transfer process.

For this process, the polyurethane ureas according to the invention may be used either as undercoats or as topcoats. The softness or elasticity of the polyurethanes according to the invention may be adjusted by the addition of conventional less hard one-component polyurethanes, e.g. those of an aliphatic nature.

The undercoats or topcoats applied in quantities of about 5 to 30 g/m² may be combined with cellular or non-cellular polyurethane or PVC foam to build up an intermediate or topcoat, e.g. topcoats of the polyurethane urea according to the invention may be combined with bonding coats of PVC foam, or a polyurethane urea according to the invention used as undercoat may be combined with a topcoat of an aromatic single component polyurethane and bonding coats of an aromatic single component polyurethane.

Conventional additives and auxiliary agents such as agents to modify the hand of the dressing, pigments, dyes, matting agents, UV stabilizers, phenolic antioxidants, light stabilizers, agents to increase the hydrophobic character and/or levelling agents may also be used.

The dressings obtained from the polyurethane ureas according to the invention have fastness properties which cannot be obtained with conventional one-component polyurethanes or only by using polyurethanes which will only dissolve in highly polar solvents such as DMF. The great hardness and elasticity under bending are particularly advantageous.

The coatings and dressings obtained from the polyurethane ureas according to the invention are also particularly distinguished by their excellent plasticizer barrier action. They are outstanding in preventing migration of plasticizers and bleeding of dyes. They are also highly resistant to cleaning agents and especially to aqueous ethanol.

These advantages of the polyurethane ureas according to the invention are illustrated by comparison experiments described in the examples which follow.

The following macrodiols are used in the Examples:

Polyol I

Hydroxyl polyester of adipic acid and diethylene glycol with an average molecular weight of 2540 and hydroxyl number 49.

Polyol II

Polyester of o-phthalic acid and ethane diol with an average molecular weight of 400 and hydroxyl number 280.

Polyol III

Polyester of adipic acid, hexenediol and neopentyl glycol (65/35 mol %) with average molecular weight 1700 and hydroxyl content 2.0%.

Polyol IV

Propylene oxide polyether containing 4,4-dihydroxy-diphenylpropane as starter molecule; OH number 200 and average molecular weight 550.

Polyol V

Polyester of adipic acid and butanediol-(1,4) with average molecular weight 2250 and hydroxyl number 50.

Polyol VI

Polycarbonate of hexanediol-(1,6) prepared from diphenylcarbonate, hydroxyl number 56 and average molecular weight 2000.

Polyol VII

Polyester of adipic acid and hexanediol-(1,6) (molecular weight 850 and OH content of about 4.0%).

Example 1

This Example describes the preparation of a polyurethane urea according to the invention in solution.

216 g of polyol III and 76 g of polyol II are mixed with 205 g of 1-isocyanatomethyl-5-isocyanato-1,3,3-trimethyl-cyclohexane (IPDI) and reacted at 80° C. until the isocyanate content is constant at 10.2%. The reaction mixture is then left to cool to room temperature and diluted with 600 g of toluene. 400 g of isopropanol are added to the solution, followed by the gradual addition of a solution of 103 g of 1-aminomethyl-5-amino-1,3,3-trimethyl-cyclohexane (IPDA) and 200 g of isopropanol, and the solution is finally diluted with 200 g of ethyl glycol.

2000 g of a 30% polyurethane urea solution in toluene/isopropanol/ethyl glycol, having a viscosity of 1400 mPa.s at 25° C., are obtained.

Example 2

This Example also describes the composition of a polyurethane urea according to the invention.

The method of preparation is as described in Example 1. The polyurethane has the following composition:
1 mol of polyol I
5 mol of polyol IV
14 mol of IPDI and about
8 mol of hydrazine hydrate.

A 30% solution in a 29:41 mixture of toluene and isopropanol is obtained; viscosity is about 5000 mPa.s/25° C.

Example 3 (Comparison example)

This Example gives the composition of a very high quality aliphatic polyurethane which is to be compared and combined with the polyurethanes according to the invention. The method of preparation is the same as in Example 1. The polyurethane contains
1 mol of polyol VI,
2.4 mol of IPDI,
1.4 mol of IPDA.
It is in the form of a 30% solution in isopropanol/toluene/ethyl glycol (21:29:20) and has a viscosity of 15,000 mPa.s.

Example 4 (Comparison example)

Composition of a conventional polyurethane containing a low molecular weight diol and generally used according to the art for finishes. The method of preparation is as described in Example 1.
Composition:
1 mol of polyol VII
2.4 mol of IPDI
1.4 mol of IPDA.
The 25% solution in isopropanol/toluene (1:1) has a viscosity of 10,000 mPa.s.

Example 5 (Comparison example)

The example gives the composition of a polyurethane which is used according to the art for drying topcoats.
Composition:
1 mol of polyol V
3.2 mol of IPDI
2.2 mol of IPDA.
This solution is at a concentration of 25% in toluene/isopropanol/MGA (37:30:50) and has a viscosity of 8000 mPa.s.

Example 6 (Comparison example)

This example indicates an aromatic polyurethane suitable for producing dry topcoats with a good hand. The compound is prepared in solution from the following components:
1 mol of polyol V
3 mol of butanediol-(1,4)
4 mol of diphenylmethane diisocyanate.
The solution is a concentration of 30% in dimethylformamide/methyl ethyl ketone (3:2).

Example 7 (Comparison example)

This example indicates the composition of an aromatic polyurethane known in the art which is dissolved in tetrahydrofuran and requires no dimethylformamide for its application.
Composition:
1 mol of polyol V,
8.4 mol of neopentyl glycol,
0.2 mol of trimethylolpropane, and about
10.1 mol of 4,4'-diisocyanatodiphenylmethane.
The product is prepared by polyaddition in tetrahydrofuran. It is dissolved to form a 20% solution which has a viscosity of 3800 mPa.s at 25° C.

Example 8

This Example describes the preparation of a coated textile material suitable for the manufacture of bags, purses and the like. The polyurethane ureas according to the invention from Example 1 is combined with the polyurethane known in the art from Example 3. This combination is compared with the pure polyurethane from Comparison Example 3 and the known art polyurethanes from Comparison Examples 5 and 6.

Example 8a

The material for the manufacture of bags and the like is produced by applying a topcoat by doctor knife coating to a flat embossed PVC separating paper by the transfer coating technique. After its passage through a drying channel at 70° C., this topcoat has a weight of about 20 g/m$^2$.

The topcoat paste contains 700 g of the PUR solution according to the invention described in Example 1 and 300 g of the PUR solution described in Example 3, the solutions having been diluted to a solid content of 25% with a 1:1 mixture of toluene/isopropanol.

20 g of a 30% solution of cellulose acetobutyrate in methyl ethyl ketone and 10 g of a 50% solution of a polysiloxane in toluene are added to the coating paste as auxiliary agent. The paste is colored by the incorporation of 100 g of a commercial pigment paste. A total of about 250 g/m$^2$ of PVC foam paste is applied to the topcoat by two applications, using a doctor knife. The first application, weighing about 170 g/m$^2$, is passed through a channel heated to 120° C. while the second application, weighing about 80 g/m$^2$, is foamed and gelled at 180° to 190° C. after being laminated with a slightly napped cotton fabric weighing about 150 g/m$^2$.

Example 8b

The procedure is the same as indicated under 8a above. A top coating paste for foamed PVC is prepared from a solution of the polyurethane from Comparison Example 3 diluted to 25%. It is used for applying a coating weighing about 20 g/m$^2$.

Example 8c

The procedure is the same as indicated under 8a and 8b above. The polyurethane from Comparison Example 5 is used as topcoat.

Example 8d

The procedure is the same as described under 8a and 8b, using the polyurethane from Comparison Example 6 to prepare the top coating paste. Methyl ethyl ketone is used for dilution.

The various topcoats from Example 8a to 8d applied to PVC are compared by subjecting them to an abrasion resistance test in a crockmeter according to DIN 54 021. This test consists of rubbing a rag over the film. The amount of color rubbed off after storage of the samples under hydrolyzing conditions is assessed. Blooming is assessed according to DIN 54 002.

| Top coats on PVC foam | Original immediately after production | Hydrolytic ageing at 70° C., 95% relative humidity | |
|---|---|---|---|
| | | 7 d | 14 d |
| According to the invention: | | | |
| Topcoat 8a | 5 | 4 | 4 |
| Comparisons: | | | |
| Topcoat 8b | 5 | 2 | 2 |
| Topcoat 8c | 5 | 3 | 2 |
| Topcoat 8d | 5 | 2 | 2 |

(Marks for assessment: 5 (good) to 1 (poor)).

This test shows that a topcoat which is virtually free from loss of color pigment and plasticizer can only be obtained with the polyurethane according to the invention. The sample also shows excellent adherence of the polyurethane and higher resistance to dry and wet abrasion than all of the other samples. The sample also shows high resistance to rubbing with a rag moistened with aqueous alcohol.

Example 9

This Example describes the manufacture of an artificial leather using a coated non-woven web of the type used as shoe lining. The polyurethane according to the invention from Example 1 is compared here with the polyurethanes from Comparison Examples 4 and 7.

Example 9a

A topcoat paste containing 1000 g of the PUR solution according to the invention described in Example 1, 50 g of toluene and 50 g of isopropanol as diluents, 30 g of a commercial pigment paste and 5 g of a 60% solution of a polysiloxane in toluene is spread over a PUR of PVC separating paper. The paste is dried at 60° to 70° C., the amount of PUR applied in terms of its solid content is 15 g/m².

A total of about 250 g/m² of PVC foam paste is applied to the topcoat by two applications with a doctor knife, as described for the manufacture of a material for bags in Example 8(a). After lamination of the second application of PVC paste with a non-woven web, the PVC is foamed and gelled at 180° to 190° C. for about 1.5 minutes.

Example 9b

The procedure is the same as described under 9a. A topcoat paste is prepared from the polyurethane solution of Comparison Example 4 and used to form a coating weighing about 15 g/m².

Example 9c

A topcoat paste is prepared from the polyurethane solution of Comparison Example 7, using the same method as under 9a. Tetrahydrofuran is used for diluting the solution. The foamed PVC is applied to form a coating weighing 15 g/m².

The various topcoats 9a to 9c on PVC artificial leather are compared by subjecting them to an abrasion resistance test in a crockmeter according to DIN 54 021.

Blooming is assessed according to DIN 54 002.

The silicone oil of examples 8 and 9 is an oxethylated polydimethyl siloxane (OS-710—Bayer AG, Leverkusen).

The pigment paste of examples 8 and 9 is a 40% TiO₂(rutil) containing aqueous paste.

The PVC-foaming paste of examples 8 and 9 are composed of 50 parts polyvinyl chloride, 37 parts of 2-ethylhexyl-phthalate, 13 parts of benzylbutyl phthalate, 1 part of azodicarbonamide and 3 parts of Pb-phthalate.

| Topcoats on PVC foam | Original immediately after its preparation | Hydrolysis at 70° C., 95% relative humidity | |
|---|---|---|---|
| | | 7 d | 14 d |
| According to the invention: | | | |
| Topcoat 9a | 5 | 5 | 4 |
| Comparisons: | | | |
| Topcoat 9b | 5 | 2 | 2 |
| Topcoat 9c | 5 | 3 | 3 |

These comparison tests also show that the example according to the invention is virtually free from blooming and therefore the best suited for the manufacture of an artificial leather.

Example 10

This Example describes the preparation of finish solutions from the polyurethanes according to the invention and the dressing of a PUR artificial leather and of leather with these solutions by application with pressure rollers and by spraying. Solution for pressure rolling: 1000 g of the PUR solution according to the invention prepared as described in Example 2 are diluted with 250 g of isopropanol, 225 g of toluene, 25 g of ethyl glycol and 30 g of cyclohexanone.

Solution for spraying: 1000 g of the PUR solution prepared according to Example 2 are diluted with 200 g of isopropanol, 1800 g of toluene and 260 g of ethyl glycol.

The solutions were used to prepare dressings for comparison which were applied to a polyurethane synthetic leather (by pressure rolling) and to a grinding box neats leather (by spraying) until a thin film was formed. The leather and synthetic leather were then ironed with an ironing plate at 100° C. and the dry abrasion resistance was tested using a Satra abrasion apparatus. Neither sample showed any tackiness under the iron. No damage was found after 3000 revolutions in the abrasion apparatus.

Example 11

The swelling of unpigmented films of the polyurethane ureas according to the invention in commercial PVC plasticizers was investigated in this Example. The polyurethanes according to the invention were compared with polyurethanes known in the art. The increase in volume of the films after 7 days' storage in PVC plasticizer was measured and converted into percent of the zero value.

| Increase in volume of the films after 7 days' storage in commercial plasticizers | | | | |
|---|---|---|---|---|
| Product | Diphenyloctyl- phosphate | Benzyl butyl phthalate | C₁₀-C₂₀ alkyl sulphonic acid phenyl esters | Dioctyl phthalate |
| According to the invention: | | | | |
| PUR from Example 1 | 85% | 75% | 10% | 10% |
| PUR from Example 2 | 90% | 80% | 10% | 10% |
| 8:2 mixture of PUR from Example 1 and from Example 3 | 130% | 100% | 15% | 10% |

-continued

| Product | Increase in volume of the films after 7 days' storage in commercial plasticizers | | | |
|---|---|---|---|---|
| | Diphenyloctyl-phosphate | Benzyl butyl phthalate | $C_{10}-C_{20}$ alkyl sulphonic acid phenyl esters | Dioctyl phthalate |
| 6:4 mixture of PUR from Example 1 and from Example 3 | 140% | 130% | 15% | 15% |
| Comparisons: | | | | |
| PUR from Example 4 | 340% | 250% | not measured | 35% |
| PUR from Example 6 | 300% | 310% | not measured | 40% |
| PUR from Example 5 | 280% | 310% | not measured | 30% |
| PUR from Example 7 | 185% | 240% | not measured | 40% |
| PUR from Example 3 | 395% | 545% | 80% | 40% |

These measurements show that the films of the polyurethane ureas according to the invention undergo comparatively little swelling in plasticizers. They also show that the polyurethanes according to the invention improve, i.e. lower the swelling values when mixed with polyurethanes known in the art, provided that compatible mixtures are obtained, i.e. clear, uncloudy films. The main advantage of the small amount of swelling in plasticizers is an indication of the suitability of the polyurethanes according to the invention for coating PVC synthetic leather.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition for coating and dressing leather and leather substitutes which is based on linear or slightly branched thermoplastic polyurethane ureas comprising the reaction product of
    (A) two macrodiol components wherein
        (1) the first component comprises one or more macrodiols having an average molecular weight of from about 254 to 650 and containing at least one benzene, cyclohexane or cyclohexene ring and
        (2) the second component comprises one or more macrodiols having an average molecular weight of from about 1200 to 3000 and wherein the average molecular weight ratio of component (A/2) to component (A/1) is at least about 3:1 and the molar ratio of component (A/2) to component (A/1) is about 1:6 to 6:1;
    (B) from about 0.5 to 11 mol of chain lengthening agent per mole of component (A) wherein at least about 50 mol % of said chain lengthening agent is selected from the group consisting of aliphatic diamines, cycloaliphatic diamines, hydrazine and mixtures thereof; and
    (C) cycloaliphatic diisocyanates wherein up to about 50 mol % of said cycloaliphatic diisocyanates may be replaced by aliphatic and/or aromatic diisocyanates.

2. The composition of claim 1 wherein component (A/1) has an average molecular weight of about 350 to 600.

3. The composition of claim 1 wherein the molar ratio of component (A/2) to component (A/1) is about 1:3 to 3:1.

4. The composition of claim 1 wherein component (A/1) comprises a member selected from the group consisting of ethanediol polyesters based on phthalic acid, polyethers based on propylene oxide and started on 4,4'-dihydroxy-diphenylpropane, and polycarbonates based on 1,4-dimethylolcyclohexane.

5. The composition of claim 1 wherein about 0.8 to 7.5 mol of component (B) is used per mole of component (A).

6. The composition of claim 1 wherein at least about 50 mol % of chain lengthening agent (B) is selected from the group consisting of aliphatic diamines, cycloaliphatic diamines and mixtures thereof.

7. The composition of claim 1 wherein about 1.2 to 4.5 mol of component (B) is used per mole of component (A) and component (B) is selected from the group consisting of aliphatic diamines, cycloaliphatic diamines, hydrazine and mixtures thereof.

8. The composition of claim 1 wherein component (C) contains at least about 75 mol % of a diisocyanate selected from the group consisting of 1-isocyanato-3,3,5-trimethyl-5-isocyanatomethyl-cyclohexane; 4,4'-diisocyanato-dicyclohexylmethane; and mixtures thereof.

9. The composition of claim 1 wherein the cycloaliphatic diamines of component (B) are selected from the group consisting of 1-amino-3,3,5-trimethyl-5-isocyanatomethyl-cyclohexane; 4,4'-diamino-dicyclohexylmethane; and mixtures thereof.

10. A composition for coating and dressing leather and leather substitutes which is based on linear or slightly branched thermoplastic polyurethane ureas comprising the reaction product of
    (A) two macrodiol components wherein
        (1) the first component comprises one or more macrodiols having an average molecular weight of from about 350 to 600 and containing at least one benzene, cyclohexane or cyclohexene ring and
        (2) the second component comprises one or more macrodiols having an average molecular weight of from about 1200 to 3000 and wherein the average molecular weight ratio of component (A/2) to component (A/1) is at least about 3:1 and the molar ratio of component (A/2) to component (A/1) is about 1:3 to 3:1;
    (B) from about 0.8 to 7.5 mol of chain lengthening agent per mol of component (A) wherein at least about 50 mol % of said chain lengthening agent is selected from the group consisting of aliphatic diamines, cycloaliphatic diamines, hydrazine and mixtures thereof; and
    (C) cycloaliphatic diisocyanates wherein up to about 25 mol % of said cycloaliphatic diisocyanates may be replaced by aliphatic and/or aromatic diisocyanates and wherein said cycloaliphatic diisocyanates are selected from the group consisting of 1-isocyanato-3,3,5-trimethyl-5-isocyanatomethyl-cyclohexane; 4,4'-diisocyanato-dicyclohexylmethane; and mixtures thereof.

11. The composition of claim 10 wherein component (A/1) comprises a member selected from the group consisting of ethanediol polyesters based on phthalic acid, polyethers based on propylene oxide and started on 4,4'-dihydroxy-diphenylpropane, and polycarbonates based on 1,4-dimethylolcyclohexane.

12. The composition of claim 10 or 11 wherein at least about 50 mol % of chain lengthening agent (B) is selected from the group consisting of aliphatic diamines, cycloaliphatic diamines and mixtures thereof.

13. The composition of claim 10 or 11 wherein about 1.2 to 4.5 mol of component (B) is used per mole of component (A) and component (B) is selected from the group consisting of aliphatic diamines, cycloaliphatic diamines, hydrazine and mixtures thereof.

14. The composition of claim 10 or 11 wherein the cycloaliphatic diamines of component (B) are selected from the group consisting of 1-amino-3,3,5-trimethyl-5-isocyanatomethyl-cyclohexane; 4,4'-diaminodicyclohexylmethane; and mixtures thereof.

* * * * *